United States Patent [19]

Meuer et al.

[11] Patent Number: 4,556,766
[45] Date of Patent: Dec. 3, 1985

[54] DEVICE FOR CONTROLLING THE FUNCTION OF CENTRAL LUBRICATION INSTALLATIONS

[75] Inventors: Johannes Meuer; Christian Nemack; Dieter Todtenhaupt, all of Berlin, Fed. Rep. of Germany

[73] Assignee: Willy Vogel Ag, Berlin, Fed. Rep. of Germany

[21] Appl. No.: 607,253

[22] Filed: May 4, 1984

[30] Foreign Application Priority Data

May 18, 1983 [DE] Fed. Rep. of Germany ... 8314995[U]

[51] Int. Cl.⁴ ............................................. H01H 35/38
[52] U.S. Cl. .............................. 200/81.9 R; 200/82 R; 200/275
[58] Field of Search .................. 307/118; 340/59, 606, 340/611; 200/81.9 R, 82 R, 82 B, 83 J, 275

[56] References Cited

U.S. PATENT DOCUMENTS

| | | | |
|---|---|---|---|
| 2,826,754 | 3/1958 | Carignan | 200/81.9 R |
| 3,077,524 | 2/1963 | Blackburn | 200/82 R |
| 3,120,591 | 2/1964 | Lewis | 200/82 R |
| 3,596,031 | 7/1971 | Murakoshi | 200/275 |

FOREIGN PATENT DOCUMENTS 2321729 11/1974 Fed. Rep. of Germany .

*Primary Examiner*—G. P. Tolin
*Attorney, Agent, or Firm*—F. Eugene Davis, IV; Mark P. Stone

[57] ABSTRACT

In a device for controlling the function of central lubrication installations with two electrically conducting components (8, 9) integrated into a signal circuit, a contact piston (18) provides the electrical contact between these components (8, 9). The contact piston (18) is guided with zero play in a bore (17) of one of the components (8, 9). It has a sealing section (19) which, in the working position of the device, is bypassed by two side ducts (24, 26) and a connected duct (25). One (24) of the connecting ducts (24, 26) emerges at a position in the bore (17) serving to guide the contact piston (18), which position is sufficiently far removed from the outlet opening of a flow duct (22) that lubricant can only flow through the device when a comparatively large distance has been established between one component (9) and the contact piston (18).

12 Claims, 3 Drawing Figures

DEVICE FOR CONTROLLING THE FUNCTION OF CENTRAL LUBRICATION INSTALLATIONS

BACKGROUND OF THE INVENTION

The invention concerns a device for controlling the function of central lubrication installations, having at least two electrically conducting components located in a casing and integrated into a signal circuit, which components, when the lubricant is not flowing, are electrically connected to one another by means of an axially displacable contact piston located in a bore of one of the components, which piston, in the rest position, is in contact, by means of an end face, with an edge which surrounds the end of a flow duct located in one of the components and connected to an inlet for the lubricant, and which components are electrically separated from one another when the flowing lubricant lifts the end face of the contact piston from the edge of the flow duct.

A device of the above type with a cylindrical contact piston is known from the German Offenlegungsschrift No. 2,321,729, the contact piston being located with clearance in a bore of one of the components, which bore simultaneously forms a flow duct for the lubricant. In this device, a narrow annular region on the end face of the contact piston serves singly and alone to seal the flow duct in contact with the inlet for the lubricant. The known device is not fully satisfactory for several reasons. Thus, it provides no guarantee that the contact piston satisfactorily seals the end of the flow duct to be closed by it. At very small supply quantities, in particular, it must be expected that lubricant will creep past the contact piston without displacing it by an amount sufficiently large to provide a satisfactory signal. The condition for reliable and sure provision of a signal is stable interruption of the contact. This does not occur if the contact piston executes, so to speak, trembling movements forwards and backwards in the case where lubricant pulses appear. A further disadvantage is that one of the components belonging to the signal circuit is formed by a screwed pipework connection. It follows that the voltages used in the signal circuit can only be small and, as such, can contribute to erroneous indications.

SUMMARY OF THE INVENTION

The objective of the invention is to provide a device of the type considered which, while of simple construction, permits unproblematic and reliable control of the function of central lubrication installations even in the case of small supply rates. This objective is attained, in accordance with the invention, in that the contact piston has a zero play sealing section guided in the bore provided for it, that a side duct emerges into the bore, the inlet opening of which side duct is closed in the rest position by the sealing section of the contact piston but, in contrast, is left free in the working position, and that the side duct is connected to the outlet of the device.

In this arrangement, it is found to be particularly advantageous if the components belonging to the signal circuit and the contact piston are encapsulated on the outside and are electrically insulated from the casing consisting of metal in which they are supported.

BRIEF DESCRIPTION OF THE DRAWING

Further details and features of the device in accordance with the invention are provided by the subclaims and the following description of an embodiment example shown in the attached drawing. In this case:

DETAILED DESCRIPTION OF THE PREFERRED EMBODIMENTS

Figure 1:
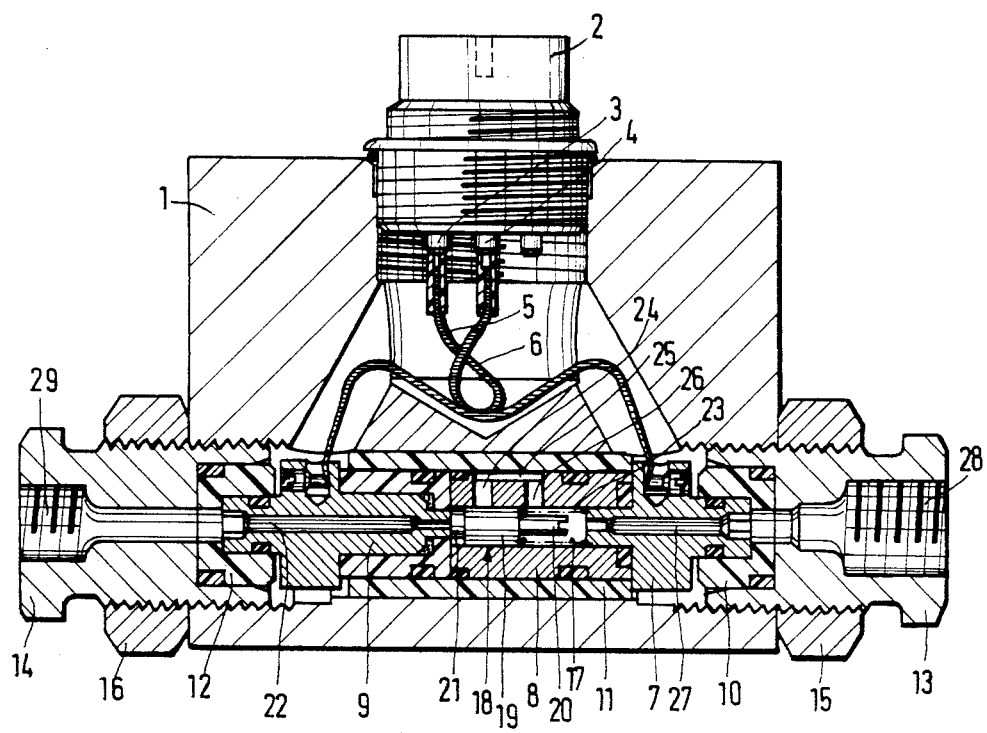
FIG. 1 shows a section through a device.

In FIG. 1, 1 is a metal casing in which is fastened a flanged socket 2. Electrically conducting components 7, 8 and 9 are connected to the connection contacts 3 and 4 via insulated lines 5 and 6, the electrically conducting components 7, 8 and 9 being held by insulation parts 10, 11 and 12. Due to the insulated and encapsulated arrangement of the components 7, 8 and 9, the magnitude of the voltage used to operate the signal circuit can be varied within wide limits to suit the particular requirements without adversely affecting operational safety. 13 and 14 are metallic connection parts screwed into the casing 1, the metallic connection parts being locked in position by nuts 15 and 16. A contact piston, generally indicated by 18, is supported in a bore 17 of the component 8. The contact piston 18 has a sealing section 19 and two protrusions 20 and 21 continuing from it. The protrusion 21 is in contact, by means of its end face, with the annular edge of the end of a flow duct 22. In the rest position of the device, it is held in this location by a spring 23, which is supported on one side by the sealing section 19 and on the other side by the end face of the component 7. 24 is a side duct which is connected to a further side duct 26 via a connecting duct 25. The side duct 26 emerges into the bore 17, which is connected to the outlet 28 of the device via a flow duct 27. The inlet to the device is indicated by 29.

The device described operates as follows:

In FIG. 1, the individual parts of the device are shown in the rest position, i.e. no lubricant is flowing and the connection contacts 3 and 4 are connected via the lines 5 and 6, the components 7, 8, 9 and the contact piston 18, i.e. an electrical current can flow. If lubricant is supplied to the device via the inlet 29, this lubricant flows through the flow duct 22 in the direction of the contact piston 18. Due to the lubricant pressure, the contact piston 18 is moved to the right against the action of the spring 23 in FIG. 1. At the beginning of the movement, the left-hand part of the sealing section 19 is in sealing contact with the inner wall of the bore 17. Only after a certain quantity of lubricant has entered the bore 17 does the end of the sealing section 19 free the access to the side duct 24 and the lubricant can pass through the side duct 24, the connecting duct 25, the side duct 26 and the flow duct 27 to the outlet 28. The protrusion 20, which is provided with a transverse slot at its end, prevents sealing of the side duct 26 by the sealing section 19 of the contact piston 18.

In other words, the contact piston 18 must first execute a certain stroke before lubricant can flow. Because of this state of affairs, a clean interruption of the contact between the component 9 and the contact piston 18 is guaranteed. Tilting of the contact piston 18 is not possible and even oscillating movements of the contact piston 18 about the position in which its sealing section 19 just frees the side duct 24 have no disturbing effect because these oscillating movements are smaller than the distance between the end face of the protrusion 21 and the annular edge of the component 9 facing it.

As soon as the contact between the contact piston 18 and the component 9 is broken, no further electrical current can flow.

Figure 2:
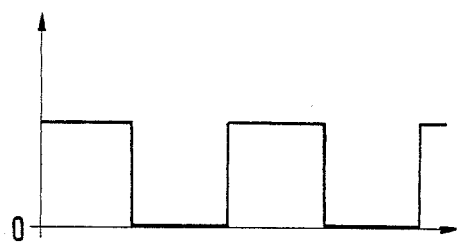
FIG. 2 shows the shape of the signals supplied by the device in accordance with FIG. 1

Because of the arrangement selected, rectangular signals of the type shown in FIG. 2 are obtained.

Figure 3:
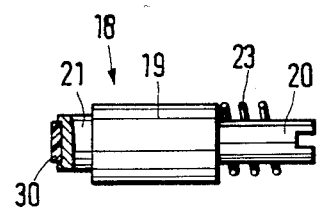
FIG. 3 shows a modified contact piston for a device in accordance with FIG. 1.

FIG. 3 shows a contact piston 18 whose protrusion 21 is provided with an elastic, electrically conducting seal 30 on its end face. The seal 30 permits greater manufacturing tolerances during the manufacture of the end face of the protrusion 21. Furthermore, it increases the lack of sensitivity of the device with respect to influences which could be initiated by small dirt particles contained in the lubricant.

We claim:

1. Device for controlling the function of central lubrication installations having at least two electrically conducting components (8,9) located in a casing (1) and integrated in a signal circuit, which components, when the lubricant is not flowing, are electrically connected to one another by means of an axially displaceable contact piston (18) located in a bore (17) of one (8) of the components (8,9), which piston, in the rest position, is in contact, by means of an end face, with an edge which surrounds the end of a flow duct (22) located in another (9) of the components (8,9) and connected to an inlet (29) for the lubricant, and which components are electrically separated from one another when the flowing lubricant lifts the end face of the contact piston (18) from the edge of the flow duct (22), characterised in that the contact piston (18) has a sealing section (19) guided in said bore (17), that a side duct (24) in said one component (8) emerges into the bore (17), the inlet opening of which side duct is closed in the rest position by the sealing section (19) of the contact piston (18) but, in contrast, is left free in the working position, and that the side duct (24) forms part of a by-pass (24, 25, 26) defined at least in part in said one component 8, said bypass being connected to the outlet (28) of the device and causing said lubricant to flow around said sealing section 19 and onto through any portion of said piston 18.

2. Device in accordance with claim 1, characterised in that the components (8,9) belonging to the signal circuit and the contact piston (18) are encapsulated on the outside and electrically insulated from the casing (1) comprising metal in which they are supported.

3. Device in accordance with claim 1, characterised in that the contact piston (18) has a main part forming the sealing section (19) and two protrusions (20, 21) continuing from it.

4. Device in accordance with claim 3, characterised in that one of the protrusions (21) is pressed, in the rest position, by a spring (23) with the end face of the protrusion against the edge of the end of the flow duct (22), while the other protrusion (20), in the working position, forms a stop limiting the displacement of the contact piston (18).

5. Device in accordance with claim 1, characterized in that said by-pass (24, 25, 26) is formed from two side ducts (24, 26) and a connecting duct (25) for by-passing the sealing section (19) of said contact piston (18) in said working position.

6. Device in accordance with claim 1, characterised in that the electrically conducting components (8, 9) are provided with straight flow ducts whose axes are aligned with the axis of the bore (17) for the contact piston (18).

7. Device in accordance with claim 1, characterised in that an elastic, electrically conducting seal (30) is located on the end face of the contact piston (18).

8. Device in accordance with claim 2, characterised in that the contact piston (18) has a main part forming the sealing section (19) and two protrusions (20,21) continuing from it.

9. Device in accordance with claim 8, characterised in that one of the protrusions (21) is pressed, in the rest position, by a spring (23) with the end face of the protrusion against the edge of the end of the flow duct (22), while the other protrusion (20), in the working position, forms a stop limiting the displacement of the contact piston (18).

10. Device in accordance with claim 2, characterized in that said by-pass (24, 25, 26) is formed from two side ducts (24, 26) and a connecting duct (25) for by-passing the sealing section (19) of said contact piston (18) in said working position.

11. Device in accordance with claim 2, characterised in that the electrically conducting components (8,9) are provided with straight flow ducts whose axes are aligned with the axis of the bore (17) for the contact piston (18).

12. Device in accordance with claim 2, characterised in that an elastic, electrically conducting seal (30) is located on the end face of the contact piston (18).

* * * * *

UNITED STATES PATENT AND TRADEMARK OFFICE
CERTIFICATE OF CORRECTION

PATENT NO. : 4,556,766
DATED : December 3, 1985
INVENTOR(S) : Johannes Meuer, et al.

It is certified that error appears in the above-identified patent and that said Letters Patent are hereby corrected as shown below:

Column 3, Line 40: Delete "onto" and substitute -- not --.

Signed and Sealed this

Eighth Day of April 1986

[SEAL]

Attest:

DONALD J. QUIGG

Attesting Officer   Commissioner of Patents and Trademarks